United States Patent
Kappelhoff

(10) Patent No.: US 10,494,020 B2
(45) Date of Patent: Dec. 3, 2019

(54) POWER STEERING FOR A VEHICLE

(71) Applicant: TRW Automotive GmbH, Alfdorf (DE)

(72) Inventor: Tim Kappelhoff, Duesseldorf (DE)

(73) Assignee: TRW Automotive GmbH, Aldorf (DE)

(*) Notice: Subject to any disclaimer, the term of this patent is extended or adjusted under 35 U.S.C. 154(b) by 177 days.

(21) Appl. No.: 15/531,018

(22) PCT Filed: Oct. 6, 2015

(86) PCT No.: PCT/EP2015/073000
§ 371 (c)(1),
(2) Date: May 26, 2017

(87) PCT Pub. No.: WO2016/087089
PCT Pub. Date: Jun. 9, 2016

(65) Prior Publication Data
US 2018/0050726 A1    Feb. 22, 2018

(30) Foreign Application Priority Data
Dec. 3, 2014  (DE) .......... 10 2014 117 802

(51) Int. Cl.
*B62D 1/16* (2006.01)
*B62D 6/10* (2006.01)
(Continued)

(52) U.S. Cl.
CPC .......... *B62D 15/0215* (2013.01); *B62D 1/16* (2013.01); *B62D 5/0403* (2013.01)

(58) Field of Classification Search
CPC .......... B62D 1/16; B62D 1/181; B62D 1/185; B62D 6/10
See application file for complete search history.

(56) References Cited

U.S. PATENT DOCUMENTS 6,986,291 B2   1/2006  Nakajima et al.
7,055,397 B2   6/2006  Nakajima et al.
(Continued)

FOREIGN PATENT DOCUMENTS

CN       1616938 A    5/2005
CN     203064019 U    7/2013
(Continued)

OTHER PUBLICATIONS

German Search Report, Application No. DE 102014117802.5 dated Jul. 22, 2015.
(Continued)

*Primary Examiner* — Faye M Fleming
(74) *Attorney, Agent, or Firm* — Macmillan, Sobanski & Todd, LLC

(57) ABSTRACT

The invention relates to a power steering for a motor vehicle, having an input shaft which is rotatable about a steering axis, a steering column tube arranged around the input shaft, a sensor housing which is axially adjacent to the steering column tube and has a housing opening for the input shaft, and a shaft expansion element which is connected with the input shaft and has an outside diameter, the input shaft extending through the steering column tube and the housing opening into the interior of the sensor housing, wherein an opening diameter of the housing opening is smaller than the outside diameter of the shaft expansion element.

9 Claims, 2 Drawing Sheets

(51) Int. Cl.
  *B62D 15/02* (2006.01)
  *B62D 5/04* (2006.01)

(56) References Cited

U.S. PATENT DOCUMENTS

| | | | |
|---|---|---|---|
| 7,117,755 | B2 | 10/2006 | Yang |
| 8,882,146 | B2 * | 11/2014 | Shibazaki ................ B62D 1/16 |
| | | | 280/775 |
| 2002/0070618 | A1 * | 6/2002 | Ikeda ..................... B62D 1/195 |
| | | | 310/91 |
| 2013/0160597 | A1 * | 6/2013 | Masuda ................. B62D 1/187 |
| | | | 74/493 |
| 2016/0304111 | A1 | 10/2016 | Kurokawa |

FOREIGN PATENT DOCUMENTS

| | | | |
|---|---|---|---|
| DE | 602004009117 | T2 | 6/2008 |
| EP | 0174206 | A2 | 3/1986 |
| EP | 1197725 | A2 | 4/2002 |
| EP | 1867553 | A1 | 12/2007 |
| WO | 2015133168 | A1 | 9/2015 |

OTHER PUBLICATIONS

PCT International Search Report and the Written Opinion, Application No. PCT/EP2015/073000, dated Jan. 28, 2016.
English Translation of the International Preliminary Report on Patentability, Application No. PCT/EP2015/07300 filed Oct. 6, 2015, dated Jun. 15, 2017.

* cited by examiner

POWER STEERING FOR A VEHICLE

CROSS-REFERENCE TO RELATED APPLICATIONS

This application is a national stage of International Application No. PCT/EP2015/073000, filed 6 Oct. 2015, the disclosures of which are incorporated herein by reference in entirety, and which claimed priority to German Patent Application No. 10 2014 117 802.5, filed 3 Dec. 2014, the disclosures of which are incorporated herein by reference in entirety.

BACKGROUND OF THE INVENTION

The invention relates to a power steering for a motor vehicle, having an input shaft which is rotatable about a steering axis, a steering column tube arranged around the input shaft, a sensor housing which is axially adjacent to the steering column tube and has a housing opening for the input shaft, and a shaft expansion element which is connected with the input shaft and has an outside diameter, the input shaft extending through the steering column tube and the housing opening into the interior of the sensor housing.

Power steering systems of this type are already known from the prior art and provide an auxiliary steering torque when required, which assists the driver in steering a motor vehicle. The input shaft is usually connected with an output shaft of the power steering by means of a torsion bar, the output shaft being, in turn, connected with steerable wheels of the motor vehicle by means of a steering gear.

Since in the case of a fracture of the torsion bar or of a torsion bar attachment a continued, reliable steering of the vehicle by means of the steering wheel must be ensured, design safeguard measures have already been proposed which make sure that in such cases a mechanical connection exists between the input shaft and the output shaft.

For example, variant embodiments are known in which a retaining ring is clipped into a groove formed on the input shaft and, further, a ring-shaped stop member is fastened in the steering column tube of the power steering, the inside diameter of the stop member being smaller than the outside diameter of the retaining ring. In this way, it is reliably prevented that the steering wheel, along with the input shaft fastened thereto, can be pulled axially out of the steering column tube and therefore the mechanical connection between the steering wheel and the steerable wheels of the motor vehicle is lost.

Since both the retaining ring and the stop member need to be manufactured as separate safety components and need to be reliably fastened to the input shaft and the steering column tube, respectively, this measure for safeguarding the axial position of the input shaft is time-consuming in terms of production engineering and assembly technology.

BRIEF SUMMARY OF THE INVENTION

It is therefore a feature of the invention to provide a power steering for a vehicle which includes a feature for safeguarding the axial position of the input shaft, the axial position safeguarding feature being simple in terms of design and advantageous in terms of production engineering and assembly technology.

This feature is achieved by a power steering of the type initially mentioned, in which an opening diameter of the housing opening is smaller than the outside diameter of the shaft expansion element. Accordingly, the housing opening in the sensor housing, which is provided at any rate, for a rotational angle sensor and/or a torque sensor is matched to the input shaft with such a precise fit that in the case of a fracture of the torsion bar or the torsion bar attachment, an edge of the housing opening constitutes an axial stop and reliably prevents an axial movement of the input shaft relative to the steering column tube with little effort.

According to a preferred embodiment, the shaft expansion element is formed integrally with the input shaft and has a contact surface which, upon a movement of the input shaft in an axial direction, in particular in the input shaft pullout direction, strikes against the edge of the housing opening. It is thereby ensured with particularly little effort that the steering wheel will remain mechanically connected with the steerable wheels of the motor vehicle even upon a fracture of the torsion bar or the torsion bar attachment.

The contact surface may be formed by a shaft shoulder here, at which a diameter of the input shaft changes from a first shaft diameter, which corresponds to the outside diameter of the shaft expansion element, to a second shaft diameter, which is smaller as compared with the first shaft diameter.

Preferably, the shaft shoulder is arranged in the interior of the sensor housing, the input shaft having the first shaft diameter in the steering column tube and the second shaft diameter in the sensor housing.

Alternatively or additionally, the shaft expansion element may also be formed by a sensor, in particular a torque sensor and/or a rotational angle sensor, which is fastened to and encloses the input shaft and has a contact surface which, upon a movement of the input shaft in an axial direction, strikes against the edge of the housing opening.

Further, the shaft expansion element may, alternatively or additionally, be formed by a separate retaining ring which is received in a groove of the input shaft so as to be axially non-displaceable, the retaining ring protruding radially beyond the outer circumference of the input shaft and having a contact surface which, upon a movement of the input shaft in an axial direction, strikes against the edge of the housing opening.

Advantageous and expedient configurations of the idea of the invention are described in the dependent claims.

Other advantages of this invention will become apparent to those skilled in the art from the following detailed description of the preferred embodiments, when read in light of the accompanying drawings.

DETAILED DESCRIPTION OF THE INVENTION

Figure 1:
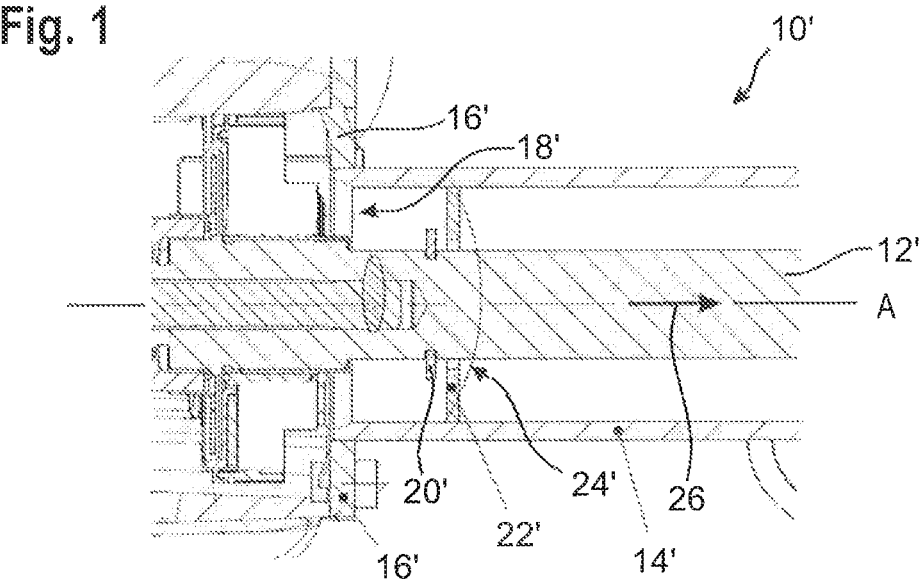
FIG. 1 shows a detail of a known vehicle power steering according to the prior art.

FIG. 1 shows a known power steering 10' for a vehicle, including an input shaft 12' which is rotatable about a steering axis A, a steering column tube 14' arranged coaxially with the input shaft 12', a sensor housing 16' which is axially adjacent to the steering column tube 14' and has a housing opening 18' for the input shaft 12', and a retaining ring 20' which is axially firmly connected with the input shaft 12'. Further, a ring-shaped stop member 22' having a recess 24' for the input shaft 12' is fastened in the steering column tube 14'.

Here, a diameter of the circular recess 24' is smaller than an outside diameter of the retaining ring 20', so that the stop member 22' prevents a movement of the input shaft 12' relative to the steering column tube 14' in the input shaft pullout direction 26.

Due to the separate retaining ring 20' and the separate stop member 22' as well as the attachment thereof to the input shaft 12' and the steering column tube 14', respectively, this feature for preventing axial pullout of the input shaft 12' is complex in terms of design and also in terms of production engineering and assembly technology.

Figure 2:
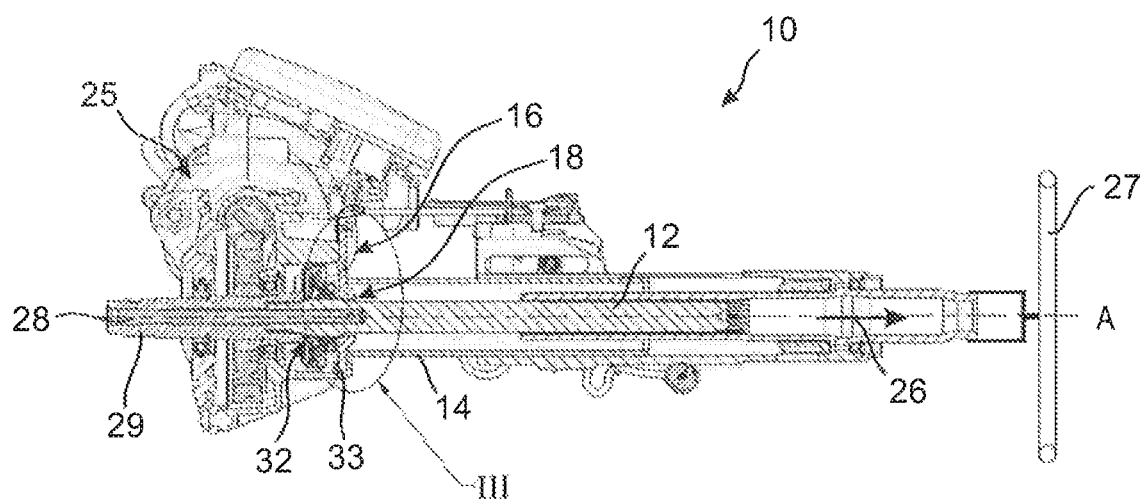
FIG. 2 shows a section taken through a power steering for a vehicle according to the invention.
Figure 3:
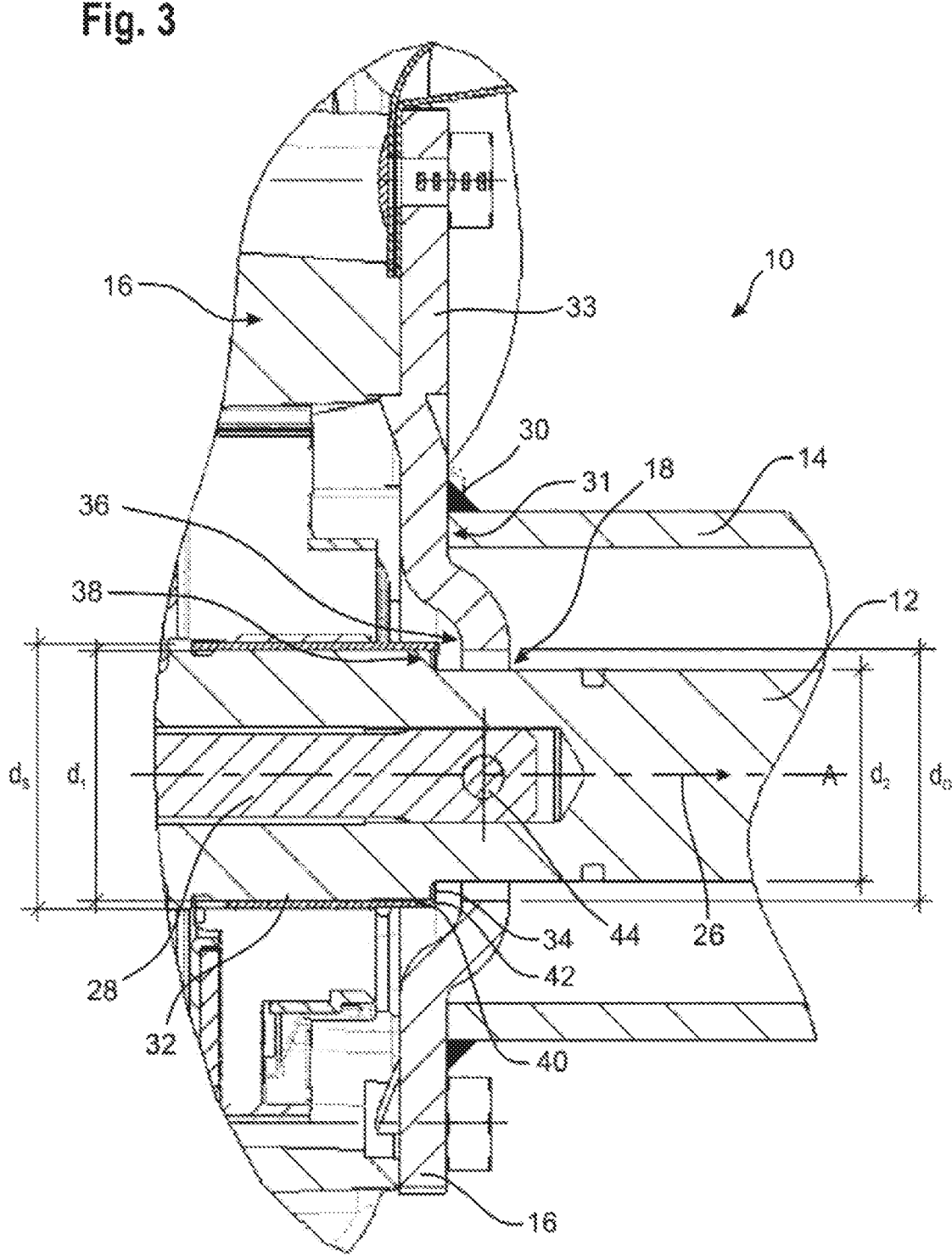
FIG. 3 shows a detail III of the power steering according to FIG. 2.

FIGS. 2 and 3 show a section and a detail of a section, respectively, of a power steering 10 for a vehicle according to the invention; in FIGS. 1 to 3, components that correspond to each other have been provided with identical reference numbers and components known from the prior art are merely provided with an additional apostrophe.

In the present exemplary embodiment, the power steering 10 involved is an electromechanical power steering, which provides a steering assist force by means of an electric motor 25. Generally, such an electromechanical power steering comprises a rotational angle sensor and/or torque sensor, such sensors being accommodated in an appropriate sensor housing 16.

According to FIG. 2, the power steering 10 comprises an input shaft 12 which is connected with a schematically illustrated steering wheel 27 for joint rotation therewith and is rotatable about a steering axis A, a steering column tube 14 arranged coaxially with the input shaft 12, and a sensor housing 16 for the rotational angle sensor and/or torque sensor, the sensor housing being axially adjacent to the steering column tube 14 and having a housing opening 18 for the input shaft 12. In the embodiment according to FIG. 2, the input shaft 12 is connected with an output shaft 29 of the power steering 10 by means of a torsion bar 28, the output shaft being coupled in a conventional manner to steerable wheels of the motor vehicle by means of a steering gear (not shown).

FIG. 3 shows a detail III of the power steering 10 according to FIG. 2 in the area of the housing opening 18 of the sensor housing 16. A weld seam 30 here schematically indicates that an axial tube end 31 of the steering column tube 14 is firmly connected with, more particularly welded to, a housing flange 33 of the sensor housing 16.

The power steering 10 further comprises a shaft expansion element 32 which is firmly connected with the input shaft 12 at least in the axial direction and has an outside diameter $d_1$, the input shaft 12 extending through the steering column tube 14 and through the housing opening 18 into the interior of the sensor housing 16, and an opening diameter $d_O$ of the housing opening 18 being smaller than the outside diameter $d_1$ of the shaft expansion element 32.

For circular housing openings 18, the opening diameter $d_O$ is to be understood to mean the diameter of the respective circle, and for non-circular housing openings 18, it is to be understood to mean a diameter of the largest circle that can be inscribed in the housing opening 18.

Furthermore, for a circular outer cross-section of the shaft expansion element 32, the outside diameter $d_1$ is to be understood to mean the diameter of the circle, and for a non-circular outer cross-section, it is to be understood to mean the minimum outside diameter of the shaft expansion element 32.

According to FIG. 2, the shaft expansion element 32 is formed integrally with the input shaft 12 and has an axial contact surface 34 which, upon a movement of the input shaft 12 in the input shaft pullout direction 26, strikes against an edge 36 of the housing opening 18.

The contact surface 34 is formed here by an annularly encircling shaft shoulder 38, at which an outside diameter of the input shaft 12 changes from a first shaft diameter, which corresponds to the outside diameter $d_1$ of the shaft expansion element 32, to a second shaft diameter $d_2$, which is smaller as compared with the first shaft diameter $d_1$.

According to FIG. 2, the shaft shoulder 38 is arranged in the interior of the sensor housing 16, the input shaft 12 having the first shaft diameter $d_1$ in the sensor housing 16 and the second shaft diameter $d_2$ in the steering column tube 14.

The housing opening 18 more particularly is a circular opening, wherein the following holds: $d_1 > d_O > d_2$. In order to ensure that a reliable axial anti-pullout safety feature for the input shaft 12 is provided, the opening diameter $d_O$ is at least 1 mm smaller than the first shaft diameter $d_1$.

According to FIG. 3, a sensor 40 is provided, in particular a rotational angle sensor and/or a torque sensor, which encloses, and is fastened to, the input shaft 12 and has an axial contact surface 42 which, upon a movement of the input shaft 12 in an axial direction, in particular in the input shaft pullout direction 26, strikes against the edge 36 of the housing opening 18.

Consequently, the shaft expansion element 32 may, as an alternative or in addition to the shaft shoulder 38, also be formed by this sensor 40.

In the exemplary embodiment shown, the input shaft 12 includes the shaft shoulder 38, at which the diameter of the input shaft 12 is reduced from the first shaft diameter $d_1$ to the second shaft diameter $d_2$, which is smaller as compared with the first shaft diameter $d_1$, the sensor 40 being fastened to the input shaft 12 in the region of the first shaft diameter $d_1$ and being axially adjacent to the shaft shoulder 38. Thus, a sensor outside diameter $d_S$ is larger than the first shaft diameter $d_1$. The opening diameter $d_O$ of the housing opening 18 is then at least 1 mm smaller than the sensor outside diameter $d_S$, preferably also at least 1 mm smaller than the first shaft diameter $d_1$.

Alternatively or additionally, it is also conceivable that the shaft expansion element 32 is formed by a separate retaining ring which is arranged in the interior of the sensor housing 16. By analogy with the retaining ring 20' of FIG. 1, this retaining ring is a snap ring or an E-ring, for example, which is received in a groove of the input shaft 12 so as to be axially non-displaceable. The retaining ring protrudes radially beyond the outer circumference of the input shaft 12 here and has a C-shaped or ring-shaped contact surface which, upon a movement of the input shaft 12 in an axial direction, in particular in the input shaft pullout direction 26, strikes against the edge 36 of the housing opening 18.

In this case, too, the opening diameter $d_O$ of the housing opening 18 is at least 1 mm smaller than the outside diameter $d_1$ of the shaft expansion element 32 formed by the separate retaining ring.

As a result of the shaft expansion element 32, which is preferably formed integrally with the input shaft 12, and the precisely fitting opening diameter $d_O$ of the housing opening 18 in the sensor housing 16, which is provided anyway, for the rotational angle sensor and/or torque sensor, a simple input shaft anti-pullout device, which reliably prevents a movement of the input shaft 12 relative to the steering column tube 14 in the input shaft pullout direction 26, is obtained with little effort in terms of design and in terms of production engineering and assembly technology. Hence, a mechanical connection between the steering wheel 28 and the steerable wheels of the motor vehicle is ensured even in the event of a fracture of the torsion bar 28 or a torsion bar attachment 44.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A power steering for a vehicle comprising
an input shaft which is rotatable about a steering axis,
a steering column tube arranged around the input shaft,
a sensor housing which is axially adjacent to the steering column tube and has a housing opening for the input shaft,
a shaft expansion element which is connected with the input shaft and has an outside diameter,
the input shaft extending through the steering column tube and the housing opening into an interior of the sensor housing,
wherein an opening diameter of the housing opening is smaller than the outside diameter of the shaft expansion element, and
wherein the shaft expansion element is formed by a sensor which is fastened to and encloses the input shaft and has a contact surface which, upon a movement of the input shaft in an axial direction, strikes against an edge of the housing opening.

2. The power steering according to claim 1, wherein the steering column tube has an axial tube end which is connected with the sensor housing.

3. The power steering according to claim 1, wherein the shaft expansion element is formed integrally with the input shaft and has a contact surface which, upon a movement of the input shaft in an axial direction, strikes against an edge of the housing opening.

4. The power steering according to claim 3, wherein the contact surface is formed by a shaft shoulder at which a diameter of the input shaft changes from a first shaft diameter, which corresponds to the outside diameter of the shaft expansion element, to a second shaft diameter, which is smaller as compared with the first shaft diameter.

5. The power steering according to claim 4, wherein the shaft shoulder is arranged in the interior of the sensor housing, the input shaft having the first shaft diameter in the sensor housing and the second shaft diameter in the steering column tube.

6. The power steering according to claim 4, wherein the housing opening is a circular opening, wherein the following holds for the opening diameter: the first shaft diameter>the opening diameter>the second shaft diameter.

7. The power steering according to claim 4, wherein the opening diameter is at least 1 mm smaller than the first shaft diameter.

8. The power steering according to claim 1, wherein the input shaft has a shaft shoulder at which a diameter of the input shaft changes from a first shaft diameter, which corresponds to the outside diameter of the shaft expansion element, to a second shaft diameter, which is smaller as compared with the first shaft diameter, the sensor being fastened to the input shaft in a region of the first shaft diameter and being axially adjacent to the shaft shoulder.

9. The power steering according to claim 8, wherein the opening diameter is at least 1 mm smaller than a sensor outside diameter.

\* \* \* \* \*